(12) United States Patent
Kuwata et al.

(10) Patent No.: US 6,947,078 B1
(45) Date of Patent: Sep. 20, 2005

(54) COLOR CORRECTION APPARATUS, COLOR CORRECTION METHOD, AND RECORDING MEDIUM HAVING COLOR CORRECTION CONTROL PROGRAM RECORDED

(75) Inventors: Naoki Kuwata, Nagano-ken (JP); Yoshihiro Nakami, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 799 days.

(21) Appl. No.: 09/670,536

(22) Filed: Sep. 27, 2000

(30) Foreign Application Priority Data

Sep. 30, 1999  (JP) ............................... 11-280813
Sep. 13, 2000  (JP) ............................. 2000-278719

(51) Int. Cl.[7] ............................. H04N 9/73; G03F 3/08; G03K 9/40
(52) U.S. Cl. ................... 348/223.1; 358/520; 382/167
(58) Field of Search .................. 348/223.1, 225.1; 358/520, 522, 523, 1.9; 382/172, 168

(56) References Cited

U.S. PATENT DOCUMENTS

| | | | |
|---|---|---|---|
| 5,130,935 A | | 7/1992 | Takiguchi |
| 5,289,295 A | * | 2/1994 | Yumiba et al. ............. 358/518 |
| 5,296,945 A | | 3/1994 | Nishikawa et al. |
| 5,307,182 A | * | 4/1994 | Maltz .......................... 358/518 |
| 5,384,601 A | | 1/1995 | Yamashita et al. |
| 5,412,491 A | * | 5/1995 | Bachar ....................... 358/500 |
| 5,517,335 A | * | 5/1996 | Shu ............................. 358/518 |
| 5,812,286 A | * | 9/1998 | Lin ............................. 358/519 |
| 5,930,009 A | * | 7/1999 | Sato et al. .................. 358/518 |
| 6,097,836 A | * | 8/2000 | Inoue ......................... 382/165 |
| 6,229,580 B1 | * | 5/2001 | Inoue ......................... 348/649 |
| 6,243,133 B1 | * | 6/2001 | Spaulding et al. ........ 348/223.1 |
| 6,256,062 B1 | * | 7/2001 | Endo ......................... 348/223.1 |
| 6,299,580 B1 | * | 10/2001 | Asafusa ...................... 348/649 |
| 2002/0171852 A1 | * | 11/2002 | Zhang et al. ................. 358/1.9 |

FOREIGN PATENT DOCUMENTS

| | | | | |
|---|---|---|---|---|
| EP | 0 502 369 A2 | | 9/1992 | |
| EP | 0 886 437 A2 | | 12/1998 | |
| JP | 02074367 A | * | 3/1990 | ............ B41J 2/525 |
| JP | 07184077 A | * | 7/1995 | ............ H04N 1/60 |
| JP | 10278350 A | * | 10/1998 | ............ B41J 2/525 |
| JP | 2000236452 A | * | 8/2000 | ............ H04N 1/60 |

OTHER PUBLICATIONS

Patent Abstracts of Japan Publication No. 11-146219, dated May 28, 1999.

* cited by examiner

*Primary Examiner*—Wendy R. Garber
*Assistant Examiner*—John M. Villecco
(74) *Attorney, Agent, or Firm*—Lowe Hauptman & Berner, LLP

(57) ABSTRACT

In a color correction apparatus for correcting the color image data, a color adjustment amount for canceling a difference between the optimum value (Rt, Gt, Bt) predetermined for the fixed-color pixel and the result of the summing-up is obtained. Therefore, the color adjustment amount is corrected on the basis of the fixed elemental color elements of the pixel, and the color image data is color-corrected on the basis of the corrected color adjustment amount. Since a computing equation for adjustment operation is simple, the processing time can be shortened. Further, since the color adjustment amount is corrected on the basis of the fixed memory color element of each pixel, it is possible to suppress color jumping.

19 Claims, 13 Drawing Sheets

COLOR CORRECTION APPARATUS, COLOR CORRECTION METHOD, AND RECORDING MEDIUM HAVING COLOR CORRECTION CONTROL PROGRAM RECORDED

BACKGROUND OF THE INVENTION

1. Field of Invention

The present invention relates to a color correction apparatus for executing the optimum color correction with respect to actual image data such as a digital photographic image, a color correction method, and a recording medium having a color correction control program recorded.

2. Description of the Related Art

Various color correcting processes have been carried out with respect to digital image data. Such color corrections include corrections that, for example, contrast is enlarged, color tone is adjusted, and brightness is adjusted. These color correcting processes are carried out by converting image data of each pixel on the basis of a fixed corresponding relation.

In an example for adjusting color tone, a color conversion table is prepared, and output data is produced with reference to the color conversion table using original image data as input data. Thereby, in case of adjustment of the skin color, the skin color part of an image becomes clear. As a method for extracting a pixel having a memory color such as the skin color, Japanese Patent Application Laid-Open No. Hei 11 (1999)-146219 discloses a method in which if image data belongs to the range of the desired color tone, its pixel is judged to be a pixel showing the skin color of a human being, and the desired color correction is applied to the pixel.

SUMMARY OF INVENTION

However, image data is not always accurate, an object having a memory color cannot be detected accurately, and appropriate color correction cannot be made sometimes.

The present invention has been accomplished in order to solve the aforementioned problem. It is an object of the invention to provide a color correction apparatus capable of carrying out appropriate color correction, a color correction method, and a recording medium having a color correction control program recorded.

According to the present invention, a color correction apparatus for correcting, on the basis of color image data representing a color image by a plurality of elemental color elements, the color image data, includes: an object pixel summing up unit for carrying out summing-up with respect to a fixed-color pixel on the basis of the color image data; a color adjustment amount computing unit for obtaining a color adjustment amount for canceling a difference between the optimum value predetermined for the fixed-color pixel and the result of the summing-up; a color adjustment amount correcting unit for correcting the color adjustment amount on the basis of the fixed elemental color elements of the pixel; and a color correcting unit for color correcting the color image data on the basis of the color adjustment amount corrected by the color adjustment amount correcting unit.

According to the thus constructed color correction apparatus for correcting, on the basis of color image data representing a color image by a plurality of elemental color elements, the color image data, summing-up with respect to a fixed-color pixel is carried out on the basis of the color image data by an object pixel summing up unit, and a color adjustment amount for canceling a difference between the optimum value predetermined for the fixed-color pixel and the result of the summing-up is obtained by a color adjustment amount computing unit. Therefore, the color adjustment amount is corrected on the basis of the fixed elemental color elements of the pixel by a color adjustment amount correcting unit; and the color image data is color-corrected by a color correcting unit on the basis of the color adjustment amount corrected by the color adjustment amount correcting unit.

In accordance with an aspect of the present invention, the object pixel summing up unit judges, as the fixed color pixel, a pixel in which a hue value obtained on the basis of the color image data is within a fixed range, and carries out summing up with respect to the judged pixel.

In accordance with an aspect of the present invention, the color adjustment amount correcting unit corrects the color adjustment amount on the basis of only addition and subtraction operation of the fixed elemental color elements of each pixel.

In accordance with an aspect of the present invention, the object pixel summing up unit judges, as the fixed color pixel, a pixel in which a hue value with respect to a memory color is within a fixed range, and carry out summing up with respect to the judged pixel.

In accordance with an aspect of the present invention, the color adjustment amount computing unit computes an average value for every elemental color element of the color image data with respect to each pixel judged as an object pixel, and uses the average value as the result of summing up of the color adjustment amount computing unit, and the color adjustment amount computing unit has the optimum value for every elemental color element with respect to the image data to be a fixed color.

In accordance with an aspect of the present invention, the color correcting unit corrects, in controlling a level of the elemental color elements, a tone curve representative of an input/output relation according to the corrected color adjustment amount to carry out color correcting of the color image data.

According to the present invention, a color correction method for correcting, on the basis of color image data representing a color image by a plurality of elemental color elements, the color image data, includes: an object pixel summing up step for carrying out summing-up with respect to a fixed-color pixel on the basis of the color image data; a color adjustment amount computing step for obtaining a color adjustment amount for canceling a difference between the optimum value predetermined for the fixed-color pixel and the result of the summing-up; a color adjustment amount correcting step for correcting the color adjustment amount on the basis of the fixed elemental color elements of the pixel; and a color correcting step for color correcting the color image data on the basis of the color adjustment amount corrected by the color adjustment amount correcting unit.

According to the thus constructed color correction method for correcting, on the basis of color image data representing a color image by a plurality of elemental color elements, the color image data, summing-up with respect to a fixed-color pixel is carried out by an object pixel summing up step on the basis of the color image data; and a color adjustment amount for canceling a difference between the optimum value predetermined for the fixed-color pixel and the result of the summing-up is obtained by a color adjustment amount computing step. Therefore, the color adjustment amount is corrected by a color adjustment amount correcting step on the basis of the fixed elemental color elements of the pixel; and the color image data is corrected by a color correcting step on the basis of the color adjustment amount corrected by the color adjustment amount correcting unit.

According to the present invention, a computer-readable has a program of instructions for execution by the computer to perform color correction processing for correcting, on the basis of color image data representing a color image by a plurality of elemental color elements. The color image data, the color correction processing includes: an object pixel summing up processing for carrying out summing-up with respect to a fixed-color pixel on the basis of the color image data; a color adjustment amount computing processing for obtaining a color adjustment amount for canceling a difference between the optimum value predetermined for the fixed-color pixel and the result of the summing-up; a color adjustment amount correcting processing for correcting the color adjustment amount on the basis of the fixed elemental color elements of the pixel; and a color correcting processing for color correcting the color image data on the basis of the color adjustment amount corrected by the color adjustment amount correcting processing.

According to the thus constructed computer-readable medium, a program of instructions for execution by the computer to perform color correction processing for correcting the color image data, on the basis of color image data representing a color image by a plurality of elemental color elements, is stored. By executing the program, summing-up with respect to a fixed-color pixel is carried out by an object pixel summing up processing on the basis of the color image data; and a color adjustment amount for canceling a difference between the optimum value predetermined for the fixed-color pixel and the result of the summing-up is obtained by a color adjustment amount computing processing. Therefore, the color adjustment amount is corrected by a color adjustment amount correcting processing on the basis of the fixed elemental color elements of the pixel; and the color image data is color-corrected by a color correcting processing on the basis of the color adjustment amount corrected by the color adjustment amount correcting processing.

According to the present invention, a color correction apparatus for correcting, on the basis of color image data representing a color image by a plurality of elemental color elements, the color image data, includes: an object pixel summing up device that carries out summing-up with respect to a fixed-color pixel on the basis of the color image data; a color adjustment amount computing device that obtains a color adjustment amount for canceling a difference between the optimum value predetermined for the fixed-color pixel and the result of the summing-up; a color adjustment amount correcting device that corrects the color adjustment amount on the basis of the fixed elemental color elements of the pixel; and a color correcting device that color-corrects the color image data on the basis of the color adjustment amount corrected by the color adjustment amount correcting device.

According to the thus constructed color correction apparatus for correcting, on the basis of color image data representing a color image by a plurality of elemental color elements, the color image data, summing-up with respect to a fixed-color pixel is carried out by an object pixel summing up device on the basis of the color image data, and a color adjustment amount for canceling a difference between the optimum value predetermined for the fixed-color pixel and the result of the summing-up is obtained by a color adjustment amount computing device. The color adjustment amount is corrected by a color adjustment amount correcting device on the basis of the fixed elemental color elements of the pixel and the color image data is color-corrected by a color correcting device on the basis of the color adjustment amount corrected by the color adjustment amount correcting device.

DESCRIPTION OF THE PREFERRED EMBODIMENTS

Figure 1:
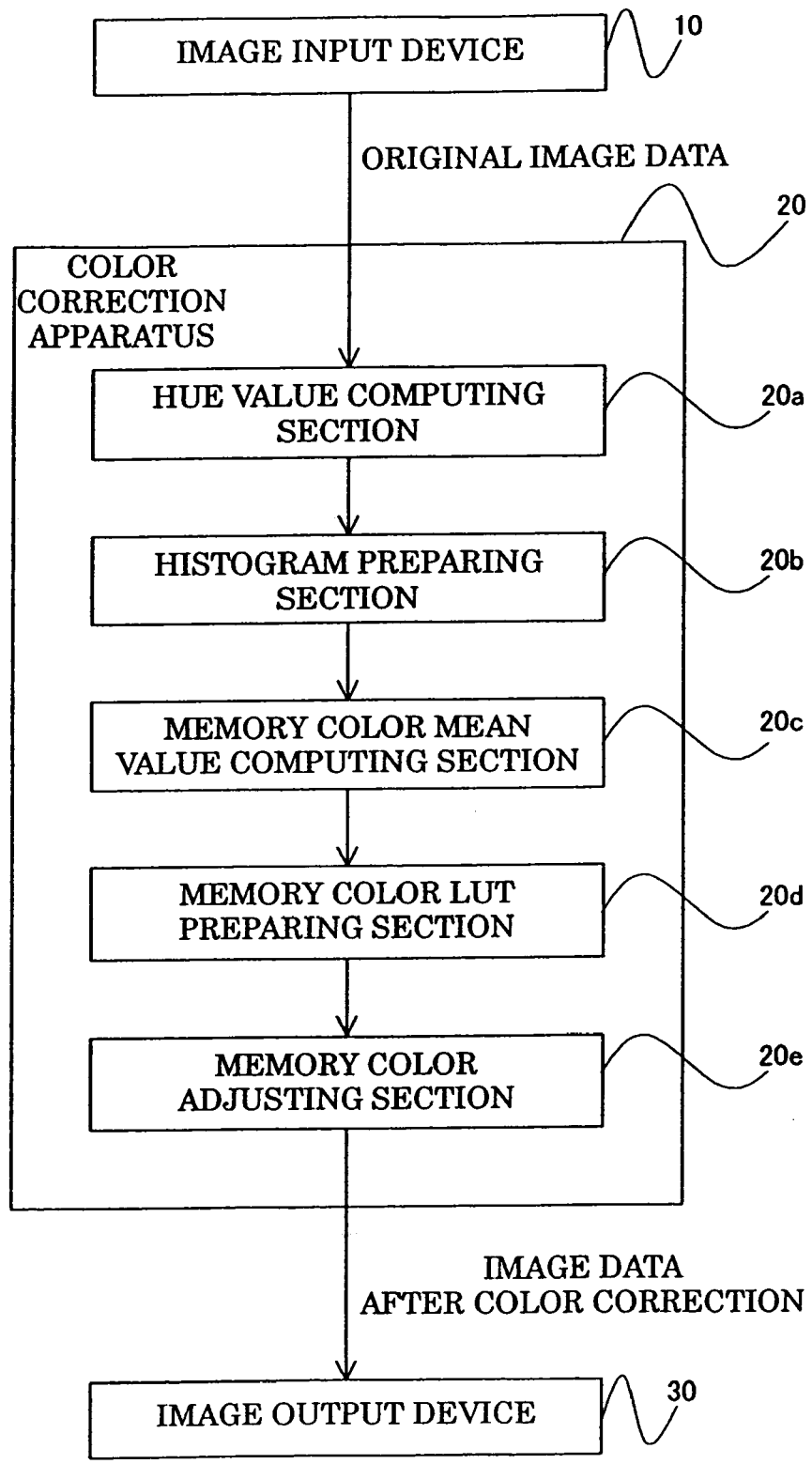
FIG. 1 is a block diagram showing a color correction system to which is applied a color correction apparatus according to one embodiment.
Figure 2:
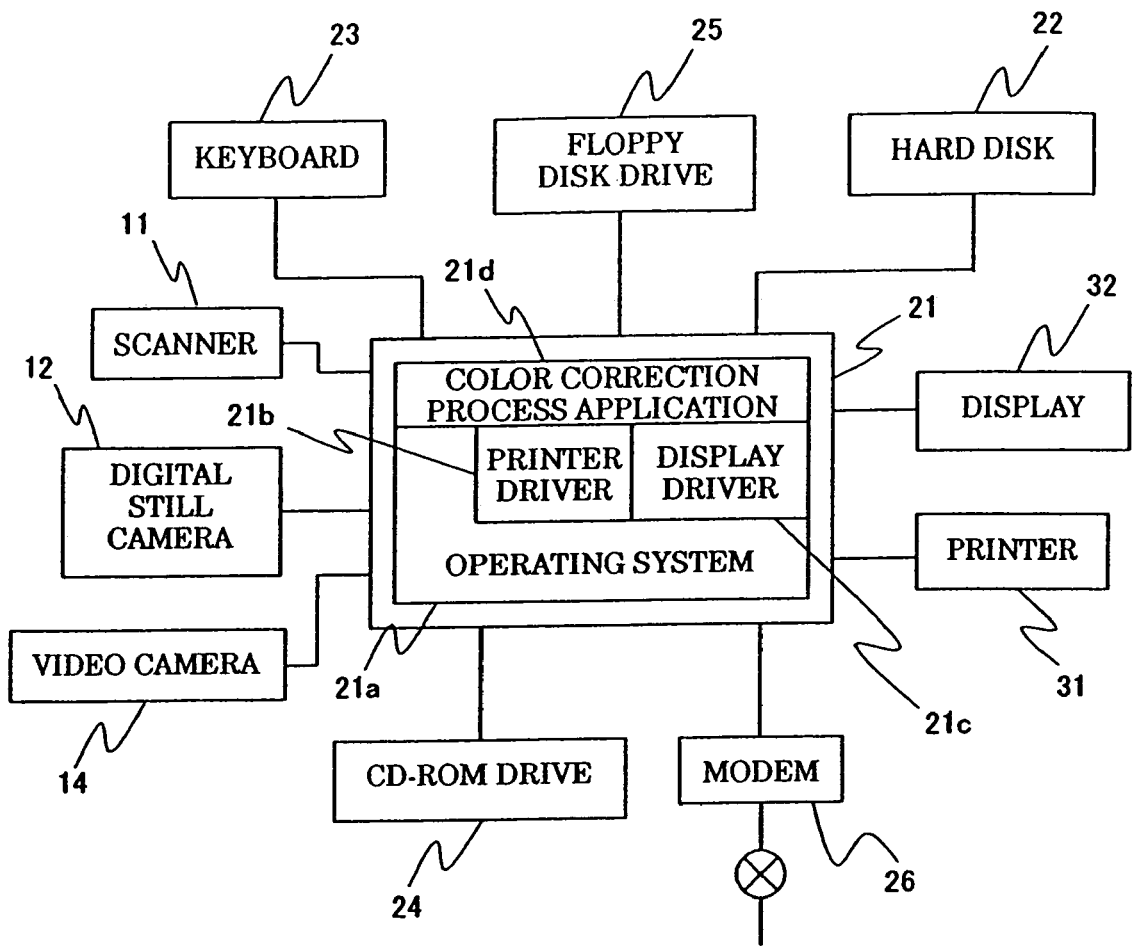
FIG. 2 is a schematic block diagram showing an example of a concrete hardware constitution.

FIG. 1 shows, by a block diagram, a color correction system to which is color correction apparatus according to one embodiment is applied, and FIG. 2 shows, by a schematic block diagram, an example of a definite hardware constitution.

In FIG. 1, an image input device 10 outputs actual image data (original image data) represented as a dot matrix-like pixel such as a photograph to a color correction apparatus 20. After the desired color correction has been applied to the input actual image data, the color correction apparatus 20 outputs color corrected image data (image data after color correction) to an image output device 30. The image output device 30 outputs the color corrected image as a dot matrix-like pixel.

The color image data output by the color correction apparatus 20 is data obtained by detecting a memory color with respect to a pixel included in a fixed color (for example, a memory color, such as sky-blue and the skin color) using a proportion of simple RGB, determining weighing by whether or not that color is close to the memory color to correct color. The color correction apparatus 20 comprises a hue value computing section 20a, a histogram preparing section 20b, a memory color mean value computing section 20c, a memory color LUT preparing section 20d, and a memory color adjusting section 20e. The details of data process for constituent parts will be mentioned later.

Definite examples of the image input device 10 are a digital still camera 12, a video camera 14 or the like in FIG. 2. Further, a definite example of the color correction apparatus 20 is a computer system comprising a computer 21, a hard disk 22, a keyboard 23, a CD-ROM drive 24, a floppy disk drive 25, and a modem 26. Definite examples of the image output device 30 are a printer 31, a display 32 or the like. The modem 26 is connected to a public telephone line and connected to an external network through the public telephone line to enable downloading a software and data.

A color correction process control program according to the present invention is normally recorded in a recording medium such as a floppy disk, a CD-ROM or the like in the form that can be read by a computer 21. The program is read by a media reading device (such as a CD-ROM drive 24, a floppy disk drive 25 or the like) and installed on a hard disk 22. CPU suitably reads the desired program from the hard disk 22 to execute the desired process.

In the present embodiment, a scanner 11 and a digital still camera 12 as the image input device 10 outputs gradation data of RGB (Green, Blue, Red) as image data, and a printer 31 as the image output device 30 requires, as an input, binary data of CMY (Cyan, Magenta, Yellow) as gradation data or CMYK with black added. Further, a display 32 requires, as an input, gradation data of RGB. On the other hand, a computer 21 is internally provided with an operating system 21a, a printer 31, a printer driver 21b corresponding to the display 32 and a display driver 21c. Further, a color correction processing application 21d is controlled in execution of process by an operating system 21a and executes fixed color correction process in cooperation with a printer driver 21b or a display driver 21c as the case may be. Accordingly, the definite role of the computer 21 as the color correction apparatus 20 is to input gradation data of RGB to prepare gradation data of RGB applied with optimum color correction, to have the display 32 displayed the gradation data through the display driver 21c, and to convert it into binary data of CMY (or CMYK) through the printer driver 21b to have the printer 31 printed.

Figure 3:
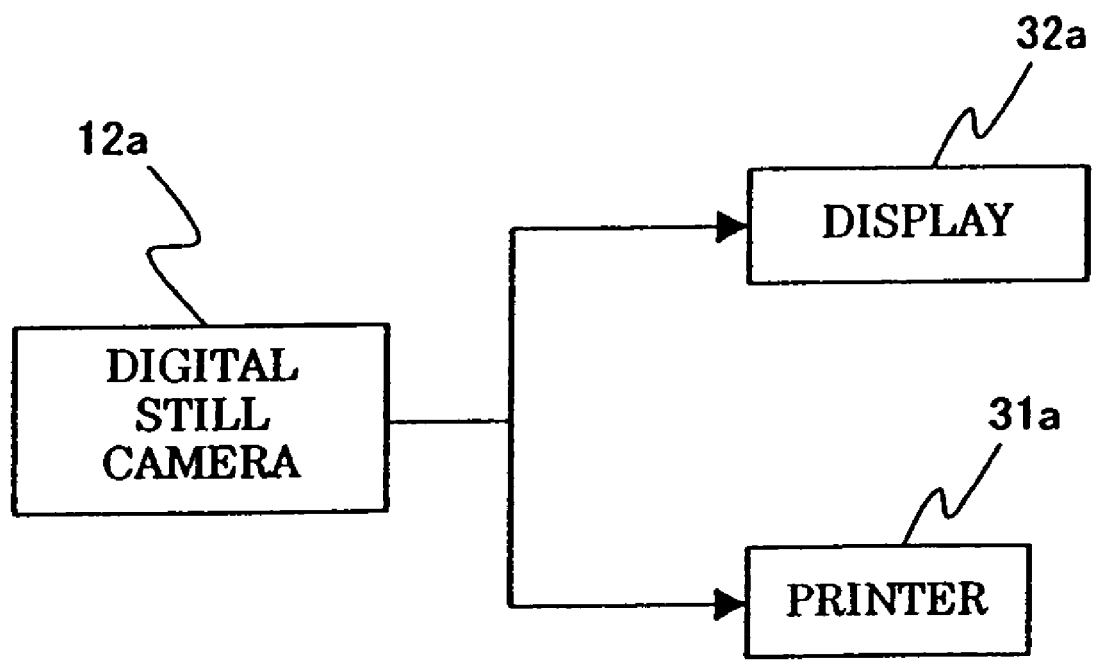
FIG. 3 is a schematic block diagram showing an example of another application of a color correction apparatus according to the present invention.
Figure 4:
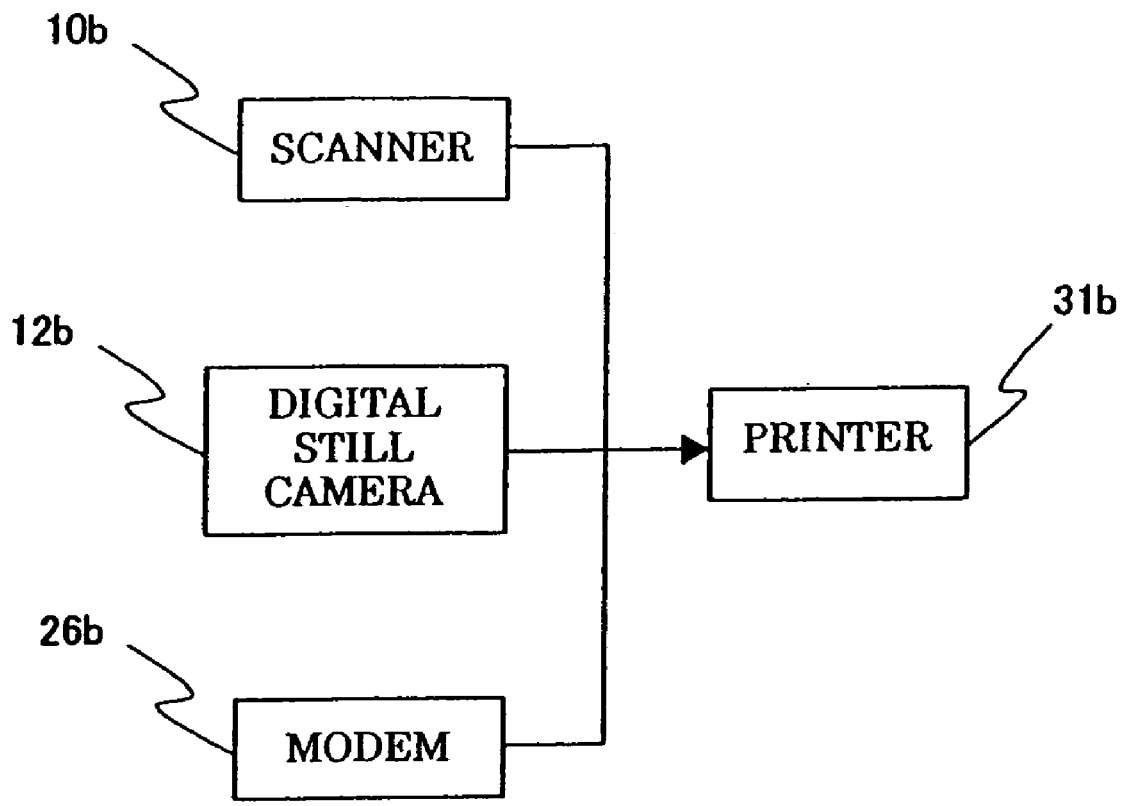
FIG. 4 is a schematic block diagram showing an example of still another application of a color correction apparatus according to the present invention.

While as described above, in the present embodiment, the computer system is incorporated into the input/output device for an image to carry out color correction, the computer is not always necessary, but a system for carrying out the desired color correction with respect to image data will suffice. For example, as shown in FIG. 3, a system may be employed in which a color correction apparatus for carrying out the desired color correction is incorporated into a digital still camera 12a, and the object is displayed on a display 32a using the converted image data or printing is done by a printer 31a. Further, as shown in FIG. 4, in a printer 31b for inputting and printing image data without intervention of a computer system, there can be employed the constitution in which the desired color correction is automatically carried out from image data input through a scanner 10b, a digital still camera 12b, a modem 26b or the like.

The color correction process program executed by the computer 21 according to the present invention will be described hereinafter with reference to FIG. 5.

Figure 6:
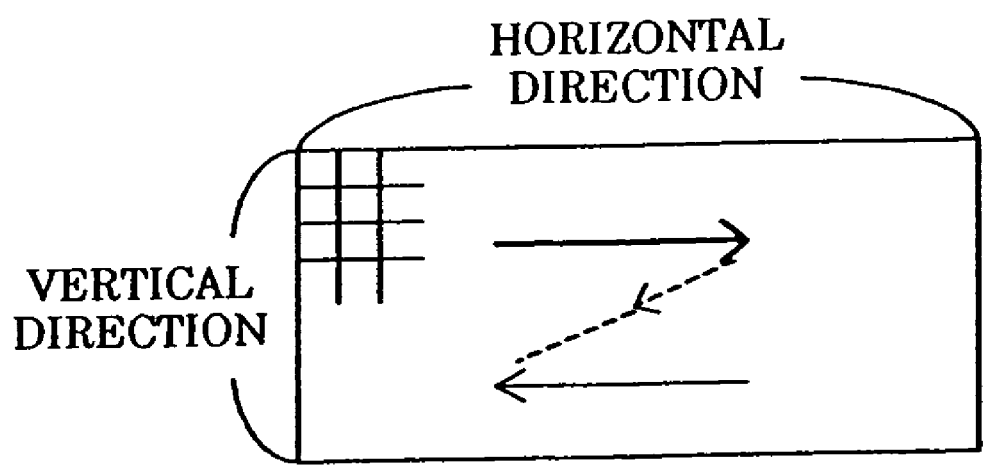
FIG. 6 is a view showing the state that a pixel to be processed is moved.

Memory colors such as green, sky-blue, and skin color are not necessarily included in the corresponding hue ranges depending on the exposure, the light source and the performance of a camera. Accordingly, it is difficult to accurately detect an object having such memory colors. So, in the color correction process, first, if a hue value of each pixel is in a range corresponding to each memory color, the value is added to a histogram. That is, in the present color correction process, the color correction is carried out by somewhat enlarging the hue range of the memory color, i.e. an object to be detected, and carrying out weighting in consideration of color elements. It is noted that in carrying out addition, summing up is to be done with respect to all the pixels while moving a pixel of an object as shown in FIG. 6.

Figure 7:
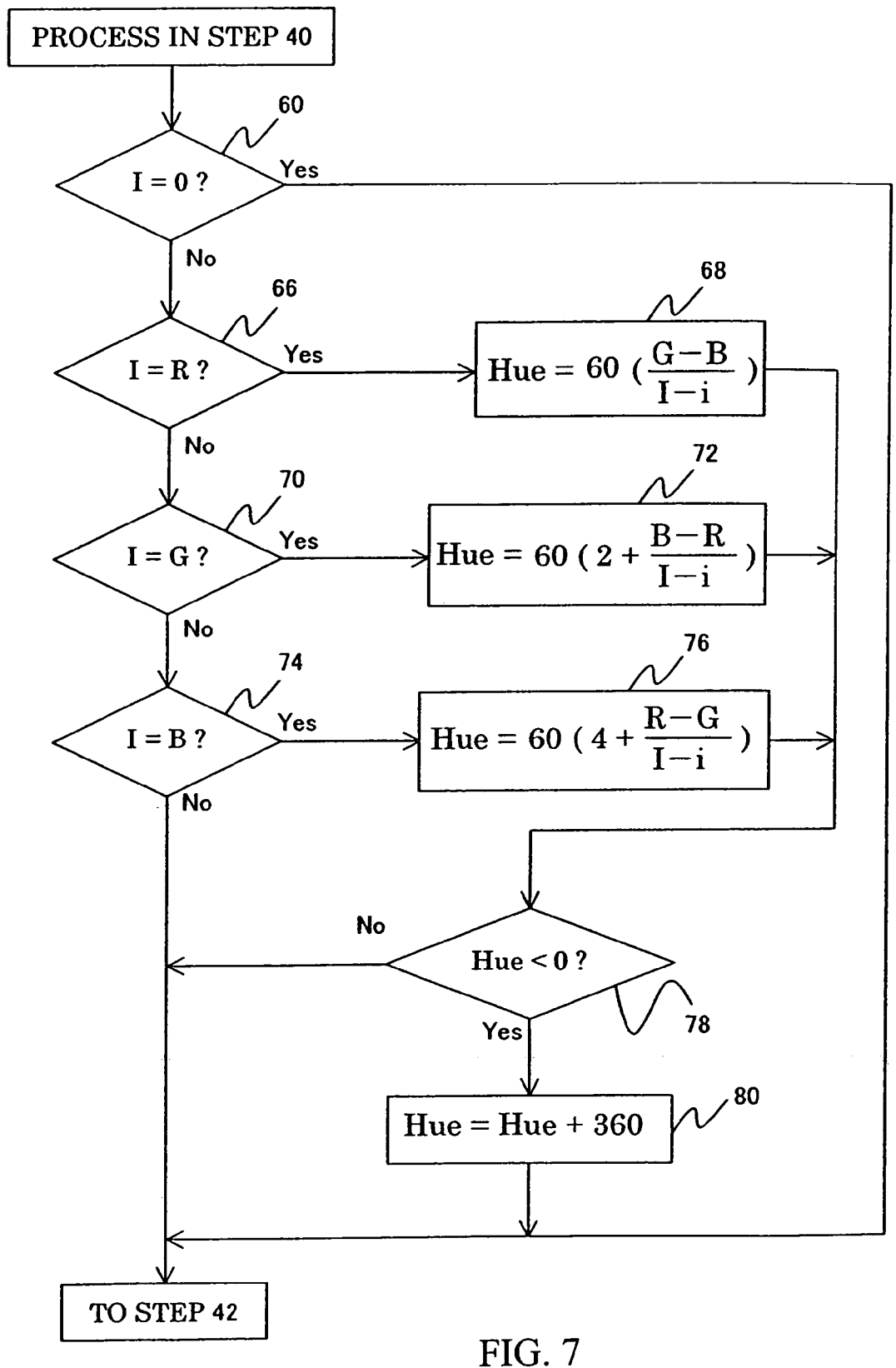
FIG. 7 is a flow chart for obtaining a hue value Hue from RGB values of pixels.

First, the hue value computing section 20a of the color correction apparatus 20 obtains a hue value Hue from a RGB value of each pixel when sampling takes place (Step 40). Computation of the hue value Hue in Step 40 will be explained with reference to FIG. 7. In the following computation, I is defined as I=max $\{R, G, B\}$, which is the maximum value out of RGB values of each pixel. Further, i is defined as i=min $\{R, G, B\}$, which is the minimum value out of RGB values of each pixel.

The hue value computing section 20a first judges whether I=0 or not (Step 60). In case I=0 (Yes in Step 60), judgment is made that the hue value Hue is indefinite, returning to Step 42.

In case of not I=0 (No in Step 60), the hue value computing section 20a judges whether I=R or not (Step 66), whether I=G or not (Step 70), and whether I=B or not (Step 74). The hue value computing section 20a takes the following steps.

In case of I=R (Yes in Step 66), $$Hue = 60\left(\frac{G-B}{I-i}\right). \qquad \text{(Step 68)}$$

In Case of I=G (Yes in Step 70), $$Hue = 60\left(2 + \frac{B-R}{I-i}\right). \qquad \text{(Step 72)}$$

In case of I=B (Yes in Step 74), $$Hue = 60\left(4 + \frac{R-G}{I-i}\right). \qquad \text{(Step 76)}$$

Where the Hue value obtained in Step 68, 72 or 76 is negative (Yes in Step 78), 360 is added to the Hue value, Hue=Hue+360

(Step 80). The process in the hue value computing section 20a is terminated, returning to Step 42 in FIG. 5.

Next, the histogram preparing section 20b judges whether or not the hue value Hue is a value within the range corresponding to each memory color (Step 42). Where the hue value Hue is a value within the range corresponding to each memory color (Yes in Step 42), in the hue histogram of each memory color, frequency corresponding to the RGB value of the color pixel are added. On the other hand, where the hue value Hue is a value outside the range corresponding to each memory color (No in Step 42), adding to the histogram is not carried out.

Figure 8:
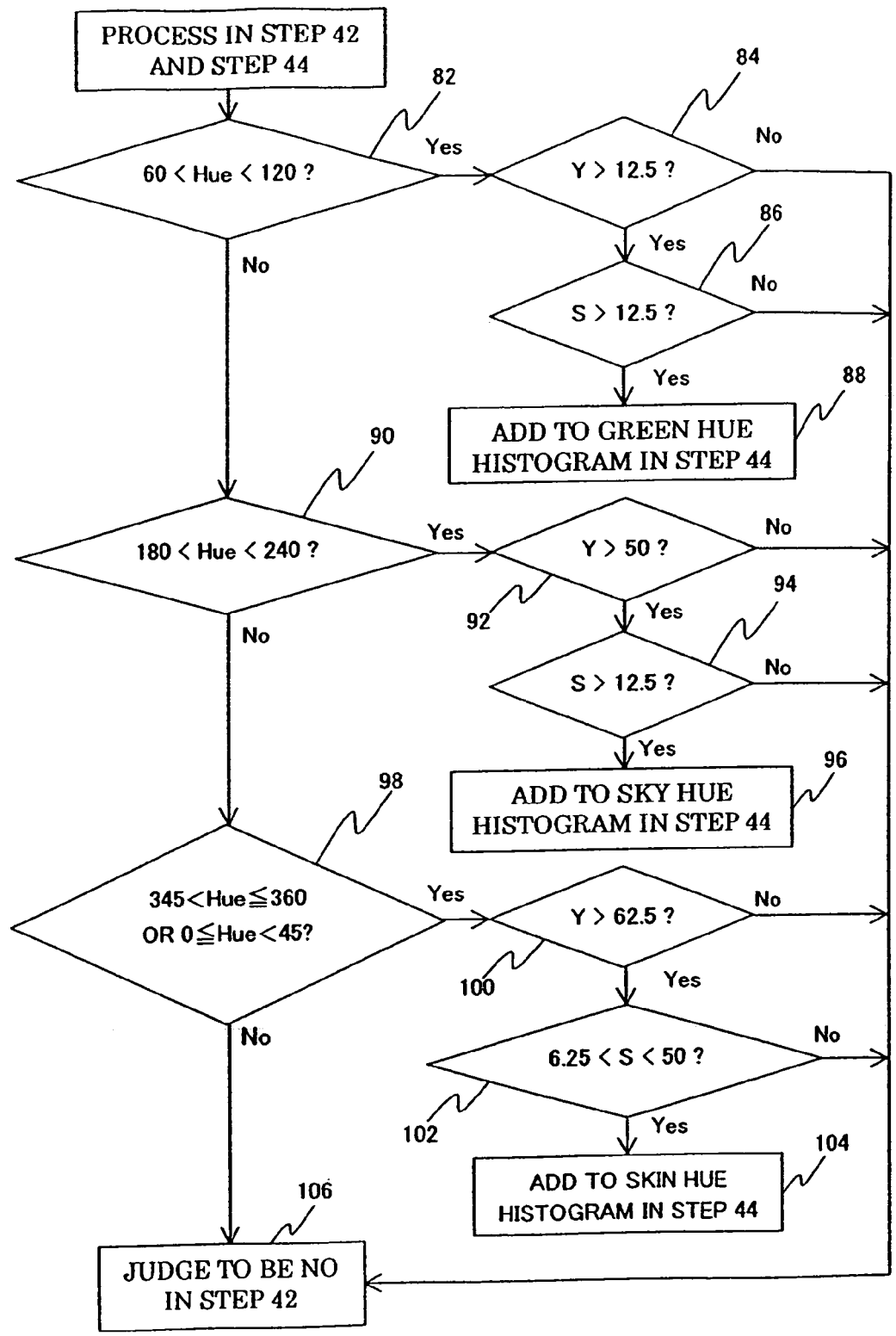
FIG. 8 is a flow chart for explaining the processes in Steps 42 and 44 of FIG. 5.

The process of Steps 42 and 44 shown in FIG. 5 by the histogram preparing section 20b will be described in detail with reference to FIG. 8. If RGB values of pixels are respectively represented by R, G, B, brightness (Y %) is calculated by $Y=0.3R+0.59G+G+0.11B$, and saturation (S %) is calculated by $$S=(I-i)/(I+i).$$

The histogram preparing section 20b judges whether or not 60<Hue<120 (Step 82). In case of 60<Hue<120 (Yes in Step 82), Y>12.5 (Yes in Step 84), and in case of S>12.5 (Yes in Step 86), then in Step 44 in FIG. 5, frequency corresponding to the RGB value of the pixel are added to the green hue histogram (Step 88). On the other hand, in case of Y≦12.5 (No in Step 84) or S≦12.5 (No in Step 86), in Step 42, judgment is made of No (Step 106).

The histogram preparing section 20b judges whether or not 180<Hue<240 (Step 90). In case of 180<Hue<240 (Yes in Step 90), Y>50 (Yes in Step 92), and in case of S>12.5 (Yes in Step 94), then in Step 44 in FIG. 5, frequency corresponding to the RGB value of the pixel are added to the sky-blue hue histogram (Step 96). On the other hand, in case of Y≦50 (No in Step 92) or S≦12.5 (No in Step 94), then in Step 42, judgment is made of No (Step 106).

Further, the histogram preparing section 20b judges whether or not 345<Hue≦360 or 0≦Hue<45 (Step 98). In case of 345<Hue≦360 or 0≦Hue<45 (Yes in Step 98), Y>62.5 (Yes in Step 100), and in case of 6.25<S<50 (Yes in Step 102), then in Step 44 in FIG. 5, frequency corresponding to the RGB value of the pixel are added to the skin-color hue histogram (Step 104). On the other hand, in case of Hus≦345 or Hue≧45 (No in Step 98) or Y≦62.5 (No in Step 100) or S≦6.25 or S≧50 (No in Step 102), then in Step 42, judgment is made of No (Step 106), returning to Step 46 of FIG. 5.

In the present embodiment, the hue ranges corresponding to the memory colors to be detected are set relatively widely. Therefore, the object having each memory color can be accurately detected.

Figure 5:
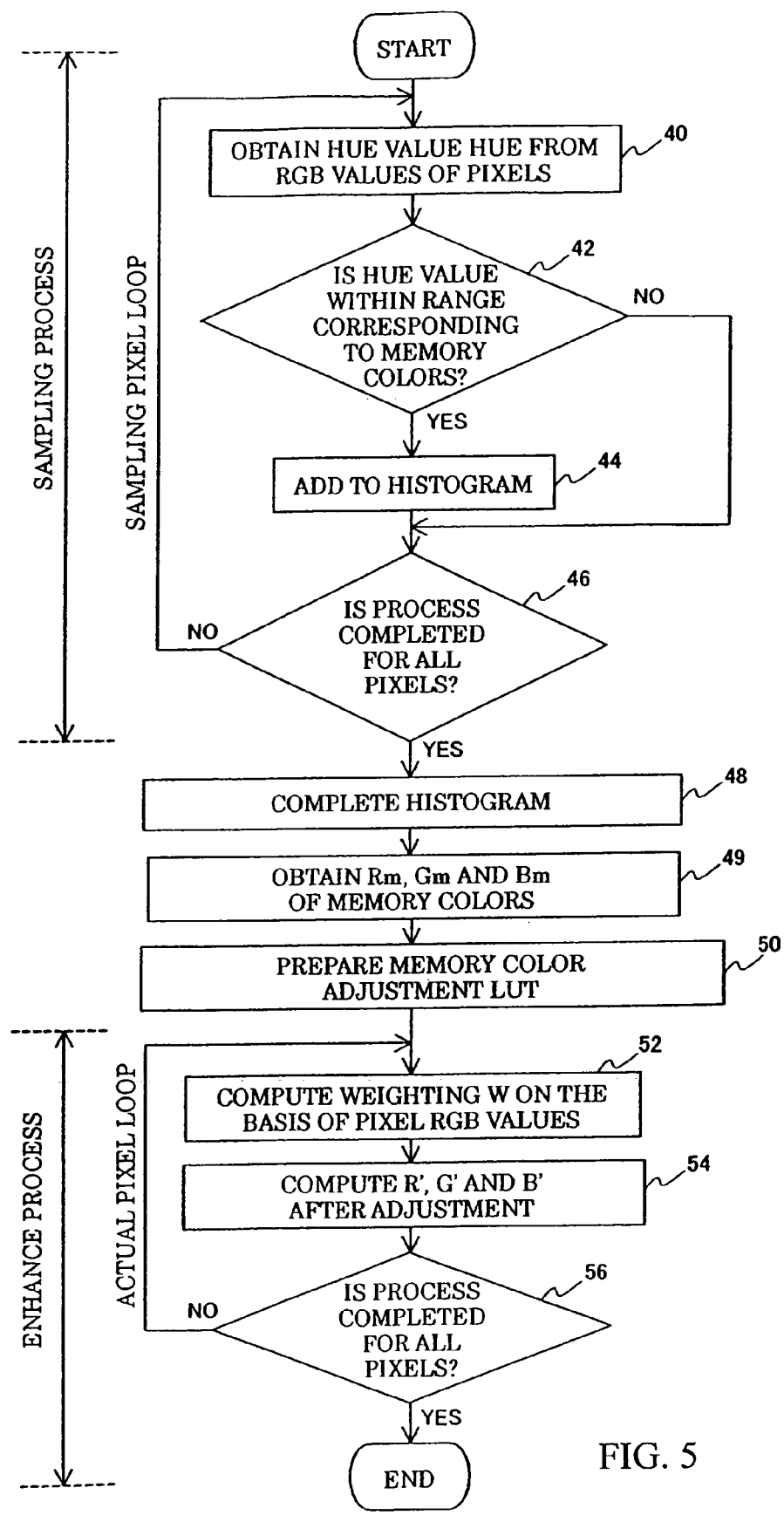
FIG. 5 is a flow chart for explaining the desired color correction of the color correction apparatus according to the present invention.

When in Step 88, 96 or 104, frequency corresponding to the RGB values of the pixels are added to the hue histogram of memory colors, the step returns to Step 46 of FIG. 5. The processes of Steps 40, 42 and 44 are repeated till the processes of Steps 40, 42 and 44 are completed with respect to all the pixels (No in Step 46). When the processes of Steps 40, 42 and 44 are completed with respect to all the pixels (Yes in Step 46), the histogram is completed (Step 48) to complete the process by the histogram preparing section 20b.

Next, when the process of the histogram preparing section 20b is completed, the memory color mean value computing section 20c obtains mean value of RGB values of memory colors from the completed histogram (Step 49) so that the features of memory colors of the images can be known. For example, if Rmem is the Red value of a memory color, and jr is the frequency, then the mean value $\overline{Rmen}$ is obtained by the following formula.

$$\overline{Rmem} = \frac{\sum_{Rmem=0}^{255} Rmem \times jr}{\sum_{R=0}^{255} jr}$$

Similarly, $\overline{Gmem}$ and $\overline{Bmem}$ can be obtained.

When the process by the memory color mean value computing section 20c is completed, the memory color LUT preparing section 20d prepares a memory color adjustment LUT (Look Up Table) by a tone curve control from a difference between target Rt, Gt, and Bt values, and RGB mean values Rm, Gm and Bm of memory colors obtained in Step 49 (Step 50).

In the present embodiment, target Rt, Gt and Bt values are defined as follows:

TABLE 1

|  | Rt | Gt | Bt | Control Point |
|---|---|---|---|---|
| Green | 0 | 192 | 20 | 64 |
| Sky blue | 12 | 32 | 128 | 192 |
| Skin | 230 | 191 | 184 | 192 |

Figure 9:
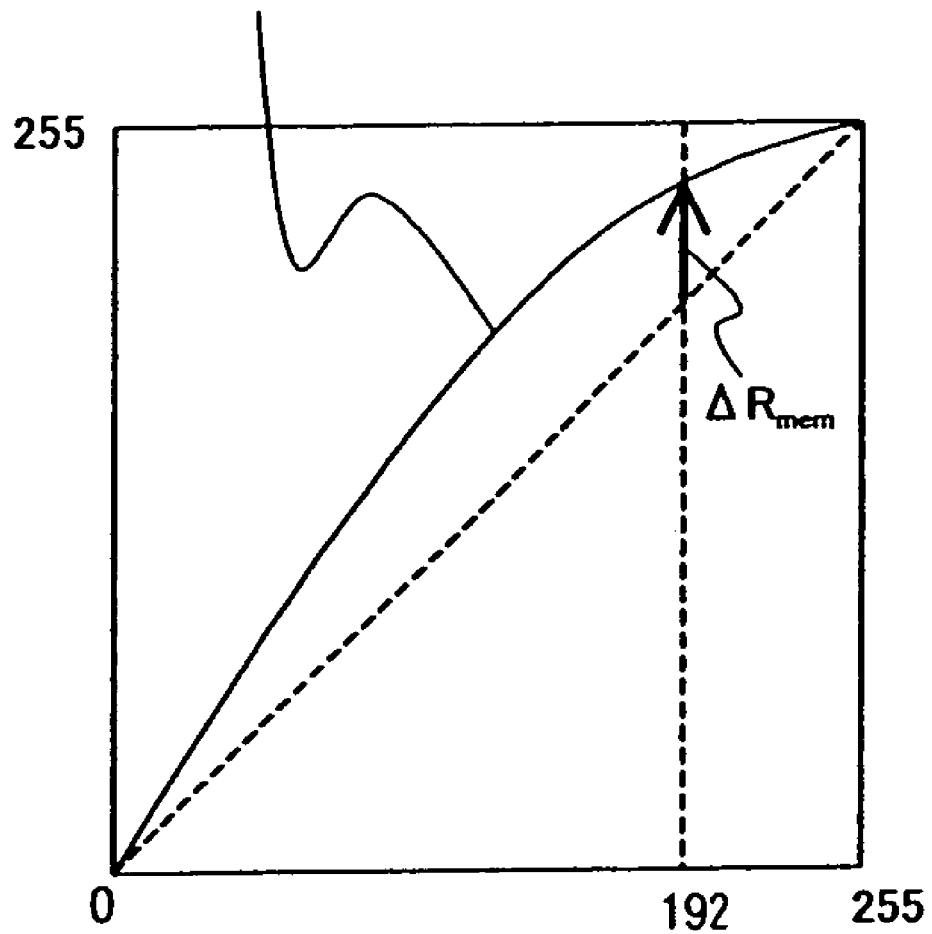
FIG. 9 is a view showing a tone curve of a store color adjustment LUT.

There prepares a memory color adjustment LUT (Look Up Table) by a tone curve control from a difference between the target Rt, Gt, and Bt values of the memory colors (green, blue sky, and skin) given in Table 1, and the RGB mean values Rm, Gm and Bm of the memory colors obtained in Step 49. As shown in Table 1, the control points are different every memory color. As for one example, the control amount of the tone curve of the Red value of the memory color (skin) is defined by the following equation.

$$\Delta Rmem = k \times (Rt - \overline{Rmem}) \tag{1}$$

Wherein k is an adjustment coefficient, which decides the adjustment amount of the memory color (control amount ΔRmem of a tone curve). As shown in FIG. 9, the tone curve of the memory color adjustment LUT is obtained by smooth interpolation using a spline curve passing through three points, gradation "0", gradation "255" and the control point (as shown in Table 1, gradation "192" in case of the memory color (skin)). While a description has been made of the control amount of the tone curve of the Red value of the skin color, it is noted that the control amounts ΔGmem and ΔBmem of the tone curve of Green value and Blue value of the skin color can be also decided similarly.

When the preparation of the memory color adjustment LUT (Look Up Table) by the memory color LUT preparing section 20d is completed as described above, the processes (Steps 52, 54 & 56 in FIG. 5) by the memory color adjusting section 20e are carried out. The memory color adjusting section 20e obtains a value after final adjustment by weighting the base LUT (Bas LUT) decided from the statistical values of the whole image and the memory color LUT according to the pixel RGB value.

Figure 10:
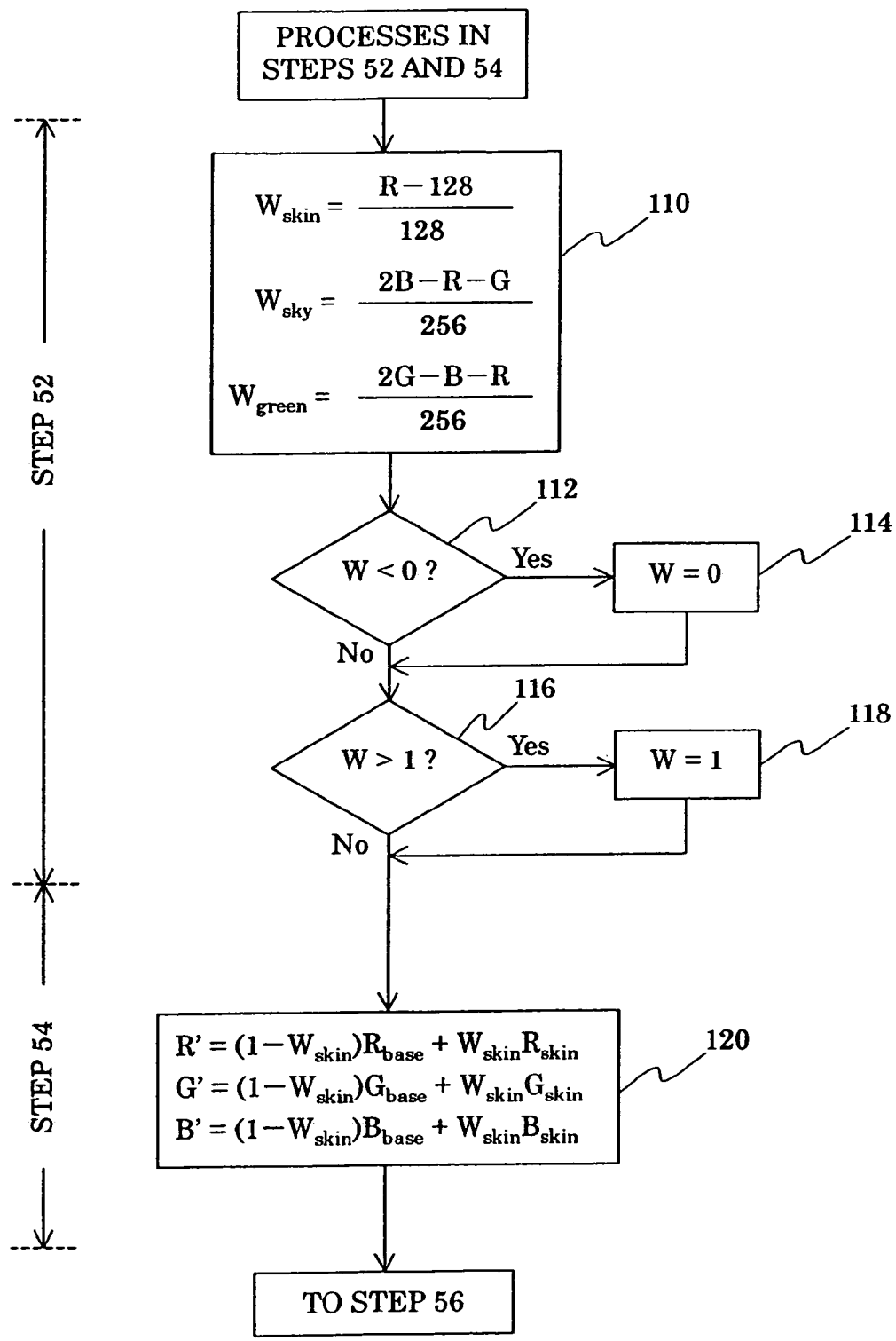
FIG. 10 is a flow chart for explaining the processes in Steps 52 and 54 of FIG. 5.

The processes in Steps 52 and 54 of FIG. 5 by the memory color adjusting section 20e will be described with reference to FIG. 10.

First, the memory color adjusting section 20e computes a weighting function W (Step 110) by the following equations:

$$Wskin = \frac{R - 128}{128} \tag{2}$$

$$Wsky = \frac{2B - R - G}{256} \tag{3}$$

$$Wgreen = \frac{2G - B - R}{256} \tag{4}$$

Here, the weighting function of the memory color (skin) is Wskin, the weighting function of the memory color (sky) is Wsky, and the weighting function of the memory color (green) is Wgreen. As described above, the weighting function W is different according to the memory colors.

The Equation (4) is modified as follows:

$$W_{green}=\{(G-B)-(G-R)\}/256 \quad (5)$$

Equation (5) shows to what degree the element G of question is strong with respect to other RB. In Equation (5), division is done by 256 because the strength of element G is normalized. The same is true for other colors B.

Thus, with respect to the equations (3) and (4), the weighting functions are proportional to what degree the element of question (B in the equation (3), and G in the equation (4)) is strong with respect to other color elements (R, g in the equation (3), and R, B in the equation (4)).

To make a boundary between a part adjusted and a part not adjusted inconspicuous, Equation $$W_{skin}=(R=1)/256 \quad (6)$$

can be also used in place of Equation (2). In Equation (6), weighting proportional to the element R is carried out. A denominator on the right side in Equation (6) was merely R but (R+1) in order that when R=255, the right side in Equation (6) is not 255/256 but (255+1)/256=1.

Next, the memory color adjusting section 20e provides the procedure that in case of W<0 (Yes in Step 112), W=0 (Step 114); in case of W>1 (Yes in Step 116), W=1 (Step 118); and the range capable of taking the weighting function W is $0 \leq W \leq 1$.

Further, the memory color adjusting section 20e obtains, in case of the skin, R', G', B' which are the RGB values after adjustment by $$R'=(1-W_{skin})R_{base}+W_{skin}R_{skin}$$
$$G'=(1-W_{skin})G_{base}+W_{skin}G_{skin}$$
$$B'=(1-W_{skin})B_{base}+W_{skin}B_{skin}$$

using the weighting functions obtained by Steps 110 to 118 (Step 120).

Here, Rbase, Gbase and Bbase are RGB values in the 'base look up table, and Rskin, Gskin, and Bskin are RGB values in the memory color adjustment look up table.

In the present embodiment, in Step 120, adjustment of RGB values has been accomplished in consideration of only the skin. However, where adjustment of memory colors are accomplished with respect to not only the skin but also sky and green simultaneously, $$R'=(1-W_{skin}-W_{sky}-W_{green})$$
$$R_{base}+W_{skin}R_{skin}+W_{sky}R_{sky}+W_{green}R_{green}$$
$$G'=(1-W_{skin}-W_{sky}-W_{green})$$
$$G_{base}+W_{skin}G_{skin}+W_{sky}G_{sky}+W_{green}G_{green}$$
$$B'=(1-W_{skin}-W_{sky}-W_{green})$$
$$B_{base}+W_{skin}B_{skin}+W_{sky}B_{sky}+W_{green}B_{green}$$

are used to obtain R', G', and B' which are RGB values after adjustment.

Figure 11:
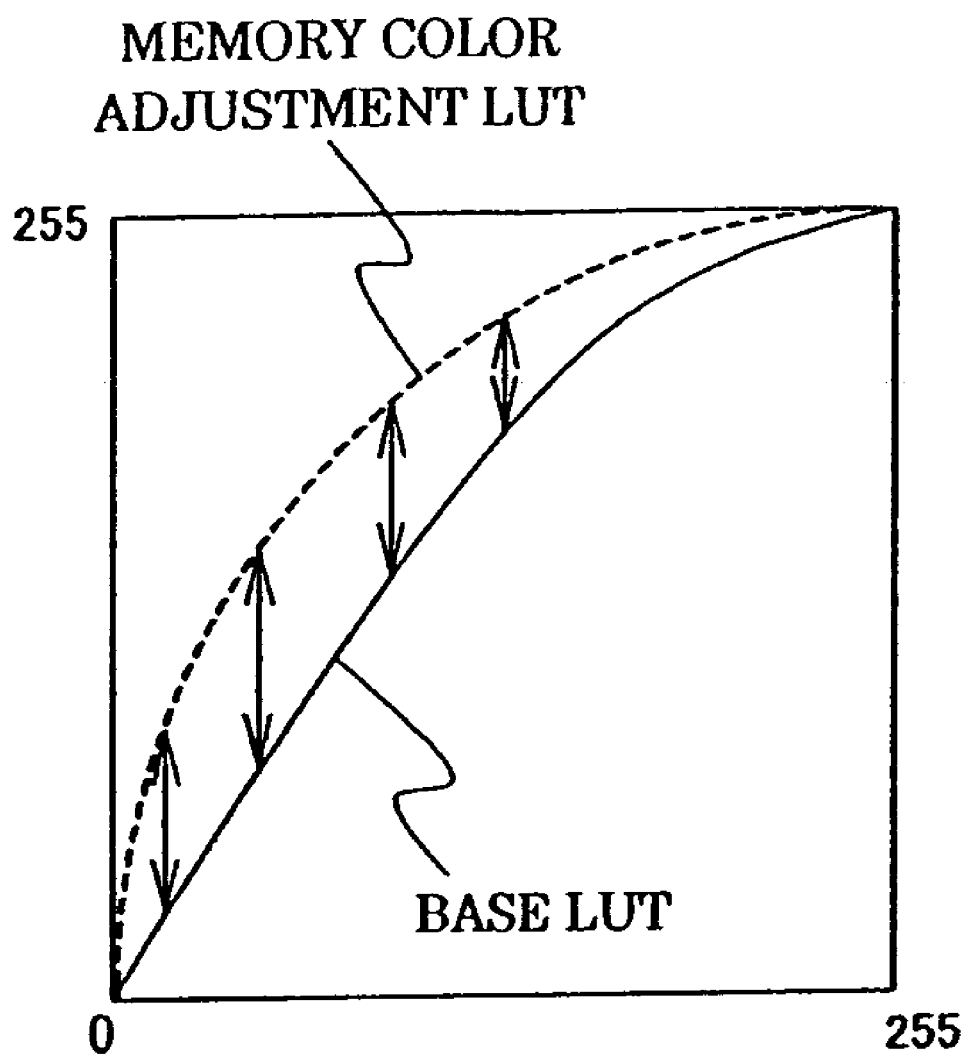
FIG 11 is a view for explaining that RGB values after adjustment assumes a value (the range indicated by arrow in the figure) between the base LUT and the memory color adjustment LUT with respect to the fixed gradation.

Here, the greater memory color-looking, the greater the weighting of a pixel value by the memory color LUT, and the smaller memory color adjustment-looking, the smaller the proportion of the 'base LUT. This indicates that as shown in FIG. 11, the adjusted RGB values takes the value (the range indicated by arrow in the figure) between the 'base LUT and the memory color adjustment LUT with respect to a fixed gradation.

After the adjusted RGB values have been obtained (after Step 120), the step returns to Step 56 of FIG. 5, where Steps 52 and 54 with respect to all pixels are repeated to execute color correction with respect to image data.

Figure 12:
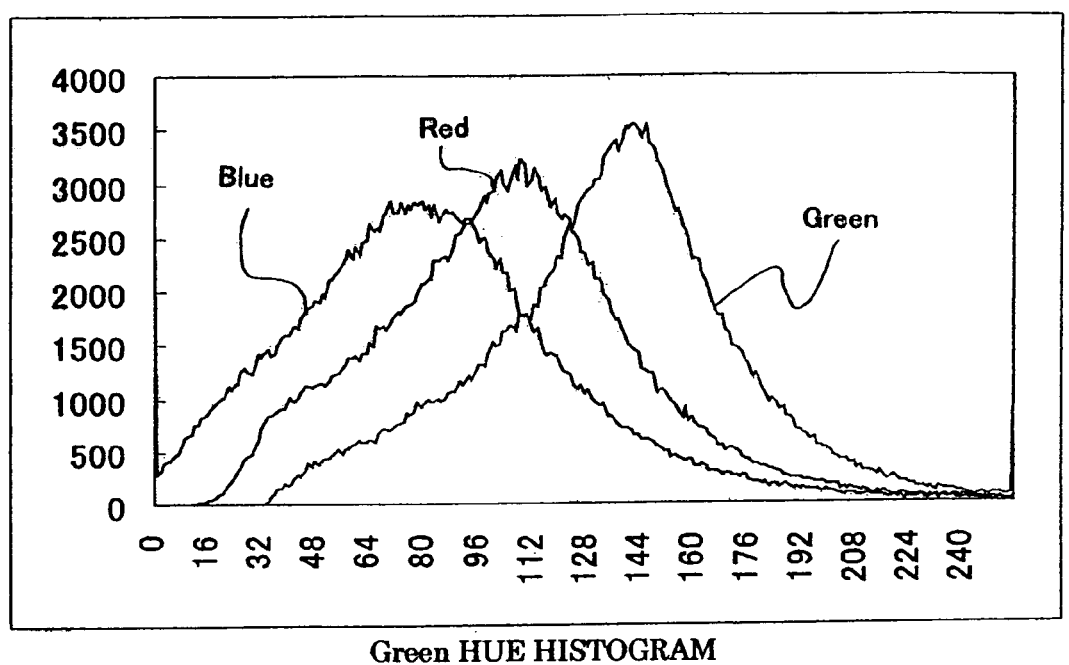
FIG. 12 is a view showing one example of a histogram of green hue.

A description will be made of the case where the process of FIG. 5 is applied to a concrete example. It is supposed that after sampling processes (Steps 40 to 46) of FIG. 5, a histogram shown in FIG. 12 in Step 48. In case of the present image, Green is an object. Mean values of memory colors in Step 49 are Rgreen=104
Ggreen=134
Bgreen=81

Next, LUT (tone curve) for memory color adjustment is prepared in accordance with the process in Step 50. The control point of green is gradation "64" from Table 1, and its control amounts are, from Equation (1)

ΔRgreen=(0−104)/5=−20
ΔGgreen=(192−134)/5=11
ΔBgreen=(20−81)/5=−12

Here, adjustment coefficient K=⅕

Figure 13:
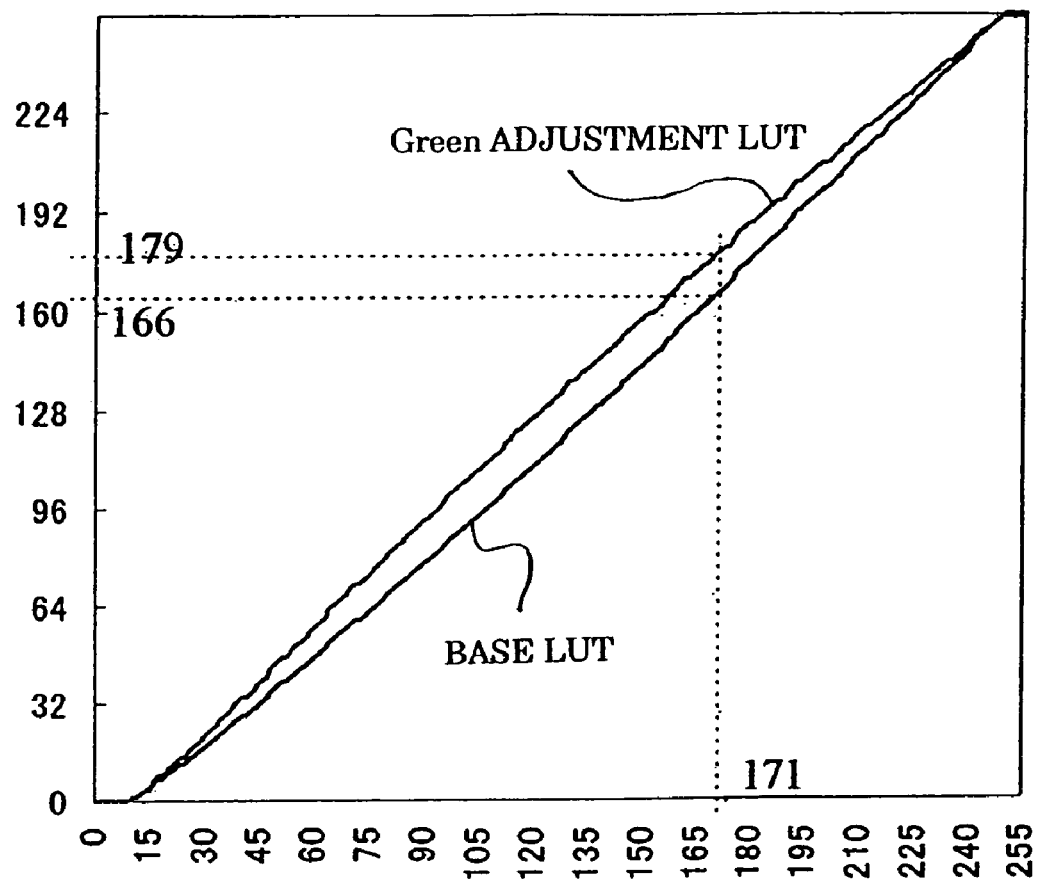
FIG. 13 is a view showing a relationship between the base LUT and the green LUT.

Next, in Steps 52 and 54, synthesis by a multi-tone curve is carried out to compute an adjustment value. FIG. 13 shows a relationship between the 'base LUT and the green LUT of the image. It is understood from FIG. 13 that green color is strengthened by the memory color adjustment.

The adjustment value is between two curves with respect to the input value. For example, in the pixel of RGB (138, 171, 118), weighting Wgreen is $$W_{green}=(2G-B-R)/256=(2\times171-138-118)/256=86/256=0.33,$$

and the adjusted value is $$G'=(1-W_{green})\times G_{base}+W_{green}\times G_{green}=(1-0.33)\cdot166+0.33\times179=170$$

With respect to R' and B', similar computation can be employed.

According to the present embodiment, in the memory color adjusting section 20e, the 'base LUT (Base LUT) decided from the statistical value of the whole image and the memory color LUT are weighted according to the pixel RGB values to obtain the value after final adjustment, and therefore, a computing equation for adjustment operation is simple, and the processing time can be shortened. Further, in the present embodiment, since the weighting is carried out on the basis of the RGB values of pixels, a hue jump can be suppressed. Further, according to the present embodiment, since only the color area of the memory colors can be adjusted, it is possible to suppress the influence on other colors to the minimum.

According to the present invention, the color adjustment value winch cancels a difference between the optimum value predetermined with respect to the pixel of the fixed color and the summed up result, the color adjustment amount is corrected on the basis of the fixed memory color element of each pixel, and the color image data is corrected in color on the basis of the corrected color adjustment amount. Therefore, a computing equation for adjustment operation is simple, and the processing time can be shortened. Further, since the color adjustment amount is corrected on the basis of the fixed memory color element of each pixel, it is possible to suppress color jumping. Further, since only the fixed color can be adjusted, it is possible to suppress the influence on other colors to the minimum.

What is claimed is:

1. A color correction apparatus for correcting, on the basis of color image data representing a color image by a plurality of elemental color elements, said color image data, said apparatus comprising:

object pixel summing up means for carrying out summing up with respect to a fixed color pixel on the basis of said color image data;

color adjustment amount computing means for obtaining a color adjustment amount for reducing a difference between the optimum value predetermined for said fixed color pixel and the result of said summing up;

color adjustment amount correcting means for correcting said color adjustment amount on the basis of said fixed elemental color elements of said pixel; and color correcting means for color correcting said color image data on the basis of the color adjustment amount corrected by said color adjustment amount correcting means;

wherein said color adjustment amount correcting means corrects said color adjustment amount on the basis of addition, subtraction, multiplication and division of the fixed elemental color elements of each pixel.

2. The correction apparatus according to claim 1, wherein said object pixel summing up means judges, as said fixed color pixel, a pixel in which a hue value obtained on the basis of said color image data is within a fixed range, and carries out summing up with respect to said judged pixel.

3. The correction apparatus according to claim 1, wherein said object pixel summing up means judges, as said fixed color pixel, a pixel in which a hue value with respect to a memory color is within a fixed range, and carries out summing up with respect to said judged pixel.

4. The correction apparatus according to claim 1, wherein said color adjustment amount computing means computes an average value for every elemental color element of said color image data with respect to each pixel judged as an object pixel, and uses said average value as the result of summing up of said color adjustment amount computing means, and said color adjustment amount computing means has the optimum value for every elemental color element with respect to the image data to be a fixed color.

5. The correction apparatus according to claim 1, wherein said color correcting means corrects, in controlling a level of the elemental color elements, a tone curve representative of an input/output relation according to said corrected color adjustment amount to carry out color correcting of the color image data.

6. The apparatus of claim 1, wherein said summing up means comprises means for computing the result of said summing up based on all pixels of the color image.

7. A color correction method of correcting, on the basis of color image data representing a color image by a plurality of elemental color elements, said color image data, said method comprising:

summing up with respect to a fixed-color pixel on the basis of substantially all said color image data;

obtaining a color adjustment amount for reducing a difference between the optimum value predetermined for said fixed-color pixel and the result of said summing-up;

correcting said color adjustment amount on the basis of said fixed elemental color elements of said pixel; and color correcting said color image data on the basis of the color adjustment amount corrected in said color adjustment amount correcting step;

wherein in the step of correcting said color adjustment amount, the color adjustment amount is corrected on the basis of addition, subtraction, multiplication and division of the fixed elemental color elements of each pixel.

8. The method of claim 7, wherein said summing up step comprises processing all pixels of the color image to obtain the result of said summing up step.

9. A computer readable medium having a program of instructions for execution by a computer to perform color correction processing for correcting, on the basis of color image data representing a color image by a plurality of elemental color elements, said color image data, said color correction processing comprising:

an object pixel summing up processing for carrying out summing up with respect to a fixed color pixel on the basis of substantially all said color image data;

a color adjustment amount computing processing for obtaining a color adjustment amount for reducing a difference between the optimum value predetermined for said fixed color pixel and the result of said summing up;

a color adjustment amount correcting processing for correcting said color adjustment amount on the basis of said fixed elemental color elements of said pixel; and a color correcting processing for color correcting said color image data on the basis of the color adjustment amount corrected by said color adjustment amount correcting processing;

wherein in said color adjustment amount correcting processing, the color adjustment amount is corrected on the basis of addition, subtraction, multiplication and division of the fixed elemental color elements of each pixel.

10. The medium of claim 9, wherein said summing up processing comprises processing all pixels of the color image to obtain the result of said summing up processing.

11. A color correction apparatus for correcting, on the basis of color image data representing a color image by a plurality of elemental color elements, said color image data, said apparatus comprising:

an object pixel summing up device that carries out summing up with respect to a fixed color pixel on the basis of substantially all said color image data;

a color adjustment amount computing device that obtains a color adjustment amount for reducing a difference between the optimum value predetermined for said fixed color pixel and the result of said summing up;

a color adjustment amount correcting device that corrects said color adjustment amount on the basis of said fixed elemental color elements of said pixel; and a color correcting device that color corrects said color image data on the basis of the color adjustment amount corrected by said color adjustment amount correcting device;

wherein said color adjustment amount correcting devices corrects said color adjustment amount on the basis of addition, subtraction, multiplication and division of the fixed elemental color elements of each pixel.

12. The apparatus of claim 11, wherein said summing up device is configured to compute the result of said summing up based on all pixels of the color image.

13. A method of correcting color image data of a color image comprising a plurality of pixels, wherein the color of each of said pixels is represented by a set of elementary color values and the elementary color values of said pixels constitute said color image data, said method comprising:

determining whether the color of each of said pixels belongs to a region of a predetermined reference color;

calculating a color adjustment amount based on the elementary color values of all the pixels that belong to the region of said reference color;

adjusting said color adjustment amount based on elementary color values of said reference color; and correcting said color image data based on the adjusted color adjustment amount obtained in the adjusting step;

wherein said calculating is performed regardless of the number of the pixels that belong to the region of said reference color; and wherein in the step of adjusting said color adjustment amount, the color adjustment amount is adjusted on the basis of addition, subtraction, multiplication and division of the elementary color values of each pixel.

14. The method of claim 13, wherein said determining is performed based on hue values of said pixels.

15. The method of claim 13, wherein said calculating comprises creating a histogram of said color image.

16. The method of claim 15, wherein said creating comprises adding to said histogram the elementary color values of only the pixels that belong to the region of said reference color.

17. The method of claim 13, wherein, in said calculating, the color adjustment amount is calculated using frequencies corresponding to the colors of the pixels that belong to the region of said reference color.

18. The method of claim 13, wherein said determining comprises processing all pixels of said color image.

19. The method of claim 13, wherein said calculating comprises creating multiple histograms corresponding to multiple reference colors; and in said determining, each and every pixel of said color image is processed to determine whether the color of said pixel belongs to a region of any of said multiple reference colors, and if so, the elementary color value of said pixel is added, in said calculating, to only the histogram corresponding to the reference color to the region of which the color of said pixel belongs.

\* \* \* \* \*